United States Patent Office 3,271,355
Patented Sept. 6, 1966

3,271,355
HYDROCARBON POLYMER CONTAINING VINYL SILANE MODIFIED SILICA
Byron M. Vanderbilt, Westfield, and Charles F. Marsden, Jr., Bedminster, N.J., assignors to Esso Research and Engineering Company, a corporation of Delaware
No Drawing. Filed Feb. 9, 1961, Ser. No. 88,032
8 Claims. (Cl. 260—41.5)

This invention relates to hydrocarbon polymers with a quartz filler-organic silane combination incorporated therein. More particularly, it is concerned with the cured thermosetting resins and/or crosslinked thermoplastic materials.

In the past, fillers such as clays, e.g., aluminum silicates, silicas, inorganic carbonates, and alumina hydrates have been employed in thermosetting resins and plastics. However, it was believed that only fillers having a particle size below about 5 microns in diameter were suitable. Coarse fillers, e.g., particle size of 10-100 microns, have been heretofore inoperative for use in either thermosetting or thermoplastic resins, since the end products had low strength and were too brittle to machine, etc.

It has now been discovered that coarse fillers, e.g. quartz, can be utilized in hydrocarbon polymers if an unsaturated silane ester is incorporated therein. Thus, in accordance with one embodiment of this invention, the coarse filler and unsaturated silane are independently added to a hydrocarbon polymer with subsequent curing to provide a thermosetting resin or crosslinked thermoplastic polymer therefrom.

If a thermosetting resinifiable mix (premix) is employed in this invention, a polymer, such as a liquid polydiolefin, can be the primary component in conjunction with a monomer, such as styrene. However, an entirely monomeric thermosetting mix can be used, e.g., styrene and divinyl benzene as the primary components therein. The preferred polymeric oils included in the thermosetting resinifiable mix are prepared from conjugated diolefins, which have 4 to 6 carbon atoms per molecule, e.g., butadiene, hexadiene, isoprene, dimethyl butadiene, piperylene, and methyl pentadiene. Such diolefins may be copolymerized with minor amounts of ethylenically unsaturated monomers, e.g., styrene, acrylonitrile, methyl vinyl ketone, or with styrenes having alkyl groups substituted on the ring, e.g., paramethyl styrene, and the dimethyl styrenes. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymers of butadiene with styrene. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane-1,4 and diethyl ether Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises when tested as a 50% solution in Varsol. The preparation of this oil in the presence of an alkali metal or peroxide catalyst is described in U.S. Patents 2,762,851 and 2,586,594, which are incorporated herein by reference.

Besides the curable polydiolefin heretofore described, this resinifiable mix may also contain other monomeric cross-linking agents. Such monomers include the vinyl aromatics, such as, styrene, the vinyl toluenes, the dimethyl styrenes, the halogenated styrenes, e.g., 2,4-dichlorostyrene; acrylic and methacrylic acid esters of monohydric alcohols, such as, butyl methacrylate; alkyl fumarates, such as, diethyl fumarate; and allyl esters, such as, diallyl phthalate; and vinyl esters, such as vinyl stearate; an acrylic acid ester of a polyhydric alcohol; polyfunctional aromatics, such as divinyl benzene and diisopropenyl benzene; and mixtures thereof. These additional cross-linking agents may be present within the range of 0 to 70% of the curable liquid mix, preferably 30 to 50%.

A catalyst is also incorporated in the resinifiable mix within the range of 0.5 to 10 parts, preferably 2 to 4 parts. The catalyst is advantageously a free radical or peroxide type such as dialkyl or aralkyl peroxides, e.g., dicumyl peroxide and ditertiary butyl peroxide; and alkyl perester peroxides, e.g., ditertiary butyl diperphthalate and tertiary butyl perbenzoate. A mixed catalyst consisting of dicumyl peroxide and ditertiary butyl peroxide is preferred. Benzoyl peroxide may also be employed in the mix, preferably in 0.5 to 1.0% concentration.

It is also advantageous, although optional, to incorporate a hindered, blocked phenol into the aforementioned mix. A preferred compound is 2,6-di-t-butyl-p-cresol which can be employed within the range of 0.2 to 1.0 part per 100 parts of resin. It is also possible, although not essential, to incorporate 1 to 10 parts of a rubbery polymer in the resin mix, such as natural rubber and polyisoprene.

It is also within the purview of this invention to incorporate all monomeric materials in the resinifiable mix in lieu of the polydiolefins. In this system, styrene is a preferred primary component and can be prepared by any known method, such as by alkylation of benzene with ethylene with subsequent dehydrogenation of the purified ethyl benzene therefrom in the presence of steam. It is also within the purview of this invention to utilize a styrene compound which has been modified to incorporate alkyl groups and/or halogen groups therein as shown in the structure herebelow:

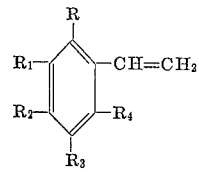

wherein R, $R_1$, $R_2$, $R_3$ and $R_4$ may be the same or different groups and are therefore independently selected from the group consisting of hydrogen, halogens, and alkyl radicals containing not more than 18 carbon atoms. Specific compounds within this genus include the following: ortho-methyl styrene, meta-methyl styrene, para-methyl styrene, ortho-ethyl styrene, para-ethyl styrene, 2,4-dimethyl styrene, 2,3-dimethyl styrene, 2,5-dimethyl styrene, para-tertiary butyl styrene, ortho-chloro styrene, meta-chloro styrene, para-chloro styrene, 2,4,5-trichloro styrene, mono-di-, and tri-fluoro styrenes, 1,4-diethyl styrene, 1-methyl 4-chloro styrene, meta-bromo styrene, ortho-bromo styrene, para-bromo styrene, 2,4-dichloro styrene, 2,5-dichloro styrene, 2,6-dichloro styrene, dibromo styrenes, and mixtures thereof. Other aromatic nuclei besides the benzene group are applicable, such as naphthalene, bisphenyl, biphenyl, and other condensed ring structures. A styrene compound generaly comprises 75 to 99 parts per hundred parts of the total mix. A polyolefinic monomer must be present in at least 0.5 part concentration in such a mix to make it applicable. One class of polyvinyl compounds within the purview of this invention are those which have the general structure as indicated herebelow:

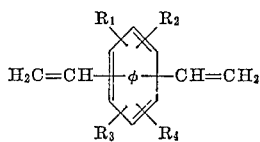

wherein $R_1$, $R_2$, $R_3$ and $R_4$ are each independently selected from the group consisting of hydrogen, halogens, alkyl groups, and a vinyl group; and $\phi$ is an aromatic nucelus such as benzene, naphthalene, biphenyl and phenanthrene. Specific examples are divinyl benzene, divinyl toluene, divinyl xylene, divinyl naphthalene and trivinyl benzene. The especially preferred compound is divinyl benzene. However, it is also possible to employ diisopropenyl benzene herein. Another class of polyolefinic monomers which are applicable are the methacrylate esters of glycols and other polyhydric alcohols. If desired, although not essential, 0.5 to 20 parts of a rubber, such as natural rubber, may be dissolved therein as a thickening agent.

Although a styrene is the major monomer, it may be replaced in part by certain other monomers, such as acrylonitrile, alpha chloroacrylonitrile, methyl methacrylate, n-butyl methacrylate, vinylidine chloride, diethyl fumarate, dibutyl fumarate, vinyl propionate, ethyl acrylate, butyl acrylate, allyl benzoate, allyl hexoate, vinyl n-butyl ether, and vinyl stearate. The styrene must constitute at least 50% of the total mix with these monofunctional monomers not exceeding 20% of the total mix.

In accordance with the first embodiment of this invention, a coarse silica, preferably quartz, is incorporated into the aforementioned resinifiable mix in conjunction with an unsaturated organic silane. The ground quartz powders found particularly applicable are commercial grades of silica sand. Commercial products developed originally for the ceramic industry contain up to 99.9% $SiO_2$ as quartz. Loss on ignition is less than 0.1%. The chemical and physical properties of quartz are well known. It has special applications due to the ability of the transparent grade to transmit ultra violet light, and due to its extremely low coefficient of expansion with increase in temperature. Furthermore, quartz is the ultimate in chemical resistance being substantially unaffected by all acids, bases, and other chemicals except hydrofluoric acid. Ground quartz powders are available under such names as Supersil potters' flint, and Konto Quintus quartz. These fillers are employed within the range of 20 to 85 parts per 100 parts of total premix. However, it is especially preferred to utilize them within the range of 75 to 80 parts, the other 25 to 20 parts being resin.

This filler is used in conjunction with an unsaturated organic silane ester which is incorporated separately into the above-described resinifiable polymeric and/or monomeric premix. The unsaturated organic silanes within the scope of the instant invention have the formula $R_n$—$Si(OR_1)_{4-n}$, wherein R is vinyl or allyl group, $n$ is a positive integer equal to 1, 2, or 3 and R is an alkyl or substituted alkyl group. The following silanes are applicable: vinyl triethoxy silane, vinyl triisopropoxyl silane, divinyl diethoxy silane, the ester of vinyl silicic acid and the monomethyl ether of ethylene glycol, allyl triethoxyl silane, and allyl dimethyl ethoxy silane. The mono and divinyl silane esters are preferred. These silanes comprise 0.05 to 2.0 parts, preferably 0.1 to 0.4 parts of the total resinifiable premix.

It is a well known technology to apply unsaturated silanes to the surface of glass fibers prior to their use in reinforced plastics. Recently this technique has been applied to certain fillers, such as clays. Applying a silane to finely divided powder is expensive both from the standpoint of the process involved and the excessive amount of silane required when using finely divided fillers as is now the practice. For example, a filler 0.5 micron in diameter would require approximately 10% by weight of A-172 (a commercial vinyl silane used for treating fiber glass) to coat the filler with a surface concentration of that usually applied to fiber glass. By using a resin which is predominantly hydrocarbon in nature we have found that the unsaturated silane can be added as its ester dissolved in the resin. Sufficient water must be on the surface of the silica or be added to the premix so that the ester groups are hydrolyzed at least in part. Thus, the silanol is formed which condenses with the Si—OH groups on the surface of the silica resulting in chemical bonding. The unsaturated group reacts with the resin during the curing process. This invention particularly concerns the use of resin and quartz filler only. By using quartz particles, previously believed to be too large for use as fillers in plastics, in combination with a hydrocarbon resin containing a vinyl silane ester, it has been possible to prepare plastics substantially as strong as when glass or other fibers are used in the premix. However, a minor proportion of fibers, preferably silica or glass fibers, may be used.

The resin and ground quartz is mixed by any suitable method. A kneader is convenient and effective. If some glass reinforcement is to be used, it should be added after the quartz powder has been thoroughly wet with the resin. If the monomeric blend is used, the quartz may be simply wet by pouring the blend over the powder in a suitable storage container or in a form which constitutes the desired shape of object to be prepared.

Such premixes may be set up by heating; the temperature and time are dependent upon the resin and catalyst employed. If baked in a press mold, temperatures of 250 to 450° F. for 45 seconds to 2 hours to provide a hard, solid reinforced plastic may be used. A post-cure, if desired, may then be employed at a temperature between 250 and 400° F. 10 minutes to 2 hours. It is also possible to employ a B-stage curing technique. The premix is partially cured by heating to give a more viscous mass but one which can still be molded under pressure. It is then subjected to a final cure at 250 to 400° F. to provide a hard, solid resin or reinforced plastic.

A thermoplastic material, e.g., a polyolefin, can be employed in the instant invention in lieu of the thermosetting resin mix heretofore described. The filler and vinyl silane are incorporated into a polyolefin; such as polyethylene, along with a suitable peroxide catalyst, and subsequently heated to give a strong crosslinked plastic. Thus, by using the vinyl silane ester, a silica filler can be used in place of carbon black to provide a crosslinked polyethylene with improved properties.

Polyolefins which are pertinent herein are made from a monomer which contains 2 to 12 carbon atoms per molecule, e.g., ethylene, propylene, butene, heptene, and the like. The polyolefin, polyethylene, being preferred, can be prepared by any known method. A suitable method is the polymerization of ethylene at low pressures, e.g., 0 to 500 p.s.i.g., and low temperature, e.g., 0 to 100° C., in the presence of a catalyst. The catalysts used in this polymerization reaction are solid, insoluble reaction products obtained by reducing a reducible transition metal compound, the metal component of which is taken from groups IV–B, VI–B, or VIII or manganese with a reducing organometallic compound of an alkali, alkaline earth, rare earth, or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR'AlX wherein R, R', and X preferably are alkyl groups having from 2 to 8 carbon atoms, although X can be hydrogen or halogen, preferably chlorine. In addition to the catalyst, an inert hydrocarbon solvent, which is preferably a $C_3$ to $C_{18}$ paraffin, e.g., isopentane, n-heptane, and the like, may be used in the polymerization. The end product, e.g., polyethylene, generally has a molecular weight in the range of 12,000 to 500,000 or more. These polyolefins are discussed in detail in the Belgian Patent 533,362; Chemical and Engineering News, April 8, 1957, pages 12 to 16; and Petroleum Refiner, December 1956, pages 191 through 196, the subject matter of which is incorporated herein by reference. The low density polyolefins are also applicable to the present invention. The aforementioned polyolefin, e.g., polyethylene, is then compounded with 40 to 300 parts of the ground quartz per 100 parts of polyethylene along with 0.2 to 5 parts of an unsaturated silane ester previously described. A peroxide catalyst, preferably of the dialkyl or diaralkyl type, such as dicumyl peroxide, is also added in 1 to 6 parts per 100 parts of polyethylene. The mixture is processed and formed to the desired shape and cured at a temperature of 280° F. to 400° F. for 2 hours to one minute to give an elastic material of increased strength and higher softening point.

Thus, in accordance with the instant invention, it is now possible to employ a quartz filler, which has a relatively large average particle size of 10 to 100 microns, in a hydrocarbon material which is capable of forming a thermoset end product. The intial hydrocarbon material may be a thermosetting resin, a styrene-divinyl benzene monomer blend, or a polyolefin such as polyethylene. Plastics of high strength are obtained therefrom.

The following examples are submitted to illustrate but not to limit this invention. Unless otherwise indicated, all parts and percentages in the specification are based upon weight.

*Example I*

A polymeric oil was provided from the compounds indicated herebelow:

| Components: | Parts |
|---|---|
| Butadiene–1,3 | 100 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene–100 K.B. value, n-heptane 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. Essentially all of the solvent was removed by stripping to give a product of essentially 100% NVM. The resulting product had a viscosity of 1.5 poise at 50% in Varsol solution and the non-volatile portion thereof had an average molecular weight of about 2,500.

Resin premix A was prepared as indicated herebelow:

| Compounds: | Parts by weight |
|---|---|
| Polybutadiene (heretofore described) | 56 |
| Vinyl toluene (containing 10% of natural rubber in solution) | 40 |
| Ethylene dimethacrylate | 4 |
| A–172 silane [a] | 1.5 |
| Parabar–441 [b] | 0.25 |
| Dicumyl peroxide | 2 |
| t-Butyl peroxide | 2 |

[a] The ester of vinyl silicic acid and the monomethyl ether of ethylene glycol.
[b] 2,6-di-t-butyl para cresol.

All of the above compounds are mixed to provide a homogeneous solution. Then, one part of water was stirred into the blend to produce a turbid, but stable suspension. To this mix was added a ground quartz sand known as 200 mesh Supersil to provide 100 parts of resin with 333 parts of the ground sand. This powdered silica is manufactured by the Pennsylvania Pulverizing Company and is over 99% pure quartz. Particle size distribution is as follows:

| | Diameters, microns |
|---|---|
| 1.7% | Greater than 74 |
| 7.1% | Between 44 to 74 |
| 9.1% | Between 32 to 44 |
| 8.2% | Between 24 to 32 |
| 19.1% | Between 15 to 24 |
| 10.9% | Between 11 to 15 |
| 18.2% | Between 5 to 11 |

Premix B was prepared which was identical to Premix A except that no silane and no water were added thereto.

Premixes A and B were cured for 10 minutes at 370° F. in a cavity mold to produce panels 5 x 9 x ⅛ inch in size. Portions of each panel were post cured for one hour at 350° F. Specimens 3 x ½ x ⅛ inch in size were cut from each panel section and tested with the following results:

| Premix | Post Cured | Flexural Strength (p.s.i.) | | Tensile Strength (p.s.i.) |
|---|---|---|---|---|
| | | Room Temp. | After 1 wk. Boil | |
| A | No | 12,900 | 13,900 | 5,800 |
| A | Yes | 14,400 | 15,200 | 7,200 |
| B | No | 2,220 | 1,660 | 1,600 |
| B | Yes | 4,750 | | 2,800 |

It is manifest from this example that a 300 to 500% improvement occurs when a silane is employed in conjunction with a coarse quartz filler as compared to when using the same filler with no silane in the resin. Furthermore, the resistance to boiling water of the molding from the hydrocarbon resin—quartz filler premix containing silane is outstanding.

*Example II*

The ground quartz fillers listed in Table I were employed in resin mixes as in Example I, along with one run with amorphous silica. Binary premixes were provided with the following proportions of fillers therein using the maximum proportion of filler and still obtaining good flowability when molded.

| Manufacturer's designation: | Percent filler in premix |
|---|---|
| 50 mesh | 83 |
| 100 mesh | 82 |
| 200 mesh | 80 |
| 270 mesh | 78 |
| 325 mesh | 75 |
| 25 microns | 73 |
| 5 microns | 66 |
| Celite–270 | 43 |

All fillers were ground quartz except the Celite–270 which was amorphous silica. It will be noted, as is well known, that for a given filler type the larger the average particle size the higher is the proportion of filler which can be used and still get a flowable moldable premix. Also, since a crystalline material, such as quartz, has a lower surface area than an amorphous powder of the same chemical composition, quartz fillers can be used in a relatively high portion as compared to amorphous silica.

For comparative purposes, the resin-quartz powder premixes were prepared using the same resin portion as that in resin premix A having a weight ratio of 77/23 except the three most finely divided quartz powders where amounts of fillers used were as indicated in the above table. The Celite also was used as indicated. Each mix was cured in a 6 x 10-inch panel (⅛-inch thick) by heating in a cavity mold for 10 minutes at 370° F. All of the end products from the resin containing silane were well wet out and translucent in appearance except that the product with 50 mesh powder therein was opaque. Evaluation data are given in Table II.

Thus, it is evident that by using an unsaturated silane ester in a hydrocarbon resin, it is possible to effectively employ quartz fillers containing particles up to about 100 microns. However, there is a definite limit in particle size to still be able to prepare storing molded articles. Ground quartz of particle size over 100 microns as the major component is definitely unsatisfactory. Also quartz powder, as exemplified by the 100 mesh material which contains 21% of particles larger than 74 microns is inferior to the use of finer material. The very suprising result is that the coarse powders as exemplified by the 200, 270 and 325 mesh powders gave superior results to the use of the 5 micron quartz, which actually has an average particle size of about 1.5 microns. Although the 25 micron powder, which has an average particle size of about 5 microns, is an effective filler it is inferior to the coarser grades in that less filler must be used in order to get a moldable product. Thus, quartz fillers with an average particle size greater than about 5 microns and less than about 50 microns average particle size are preferred.

TABLE I.—SILICA FILLERS EMPLOYED IN EXAMPLE II 50 mesh:
    5% over 300 microns
    95% between 100–300 microns
100 mesh:
    3.7% over 150 microns
    7.8%, 100–150 microns
    10%, 74–100 microns
    16%, 44–74 microns
    17%, 30–44 microns
    16%, 20–30 microns
    19.2%, 10–20 microns
    10.3%, 5–10 microns
200 mesh: See under Example I
270 mesh:
    0.7% over 74 microns
    3.3%, 44–74 microns
    6%, 40–44 microns
    14%, 30–40 microns
    19.5%, 20–30 microns
    11.5%, 15–20 microns
    12.5%, 10–15 microns
    15%, 5–10 microns
325 mesh:
    1.8% over 44 microns
    13%, 33–44 microns
    13%, 24–33 microns
    14%, 18–24 microns
    20%, 10–18 microns
    21%, 5–10 microns
25 microns:
    1.5% over 25 microns
    2.7%, 20–25 microns
    6.2%, 15–20 microns
    13.5%, 10–15 microns
    30.0%, 5–10 microns
5 microns:
    1.9% over 5 microns
    12.6%, 3–5 microns
    17.5%, 2–3 microns
    32.0%, 1–2 microns
Celite–270: 1–6 microns

TABLE II.—EVALUATION DATA FOR EXAMPLE II

| Filler Designation | Post Cure | Flexural Strength (p.s.i.) | |
|---|---|---|---|
| | | Dry | After 7 Day Water Boil |
| 50 Mesh | No | 4,900 | |
| | Yes | 5,200 | 4,270 |
| 100 Mesh | No | 11,000 | |
| | Yes | 11,800 | 11,200 |
| 200 Mesh | No | 14,100 | 13,200 |
| | Yes | 14,000 | |
| 270 Mesh | No | 13,200 | |
| | Yes | 15,300 | |
| 325 Mesh | No | 14,500 | |
| | Yes | 14,400 | |
| 25 Microns | No | 11,400 | |
| | Yes | 14,600 | |
| 5 Microns | No | 9,400 | 11,100 |
| | Yes | 11,000 | |
| Celite-270 | No | 8,450 | 9,600 |
| | Yes | 12,500 | 12,000 |

*Example III*

Panels similar to those in Example II were made with six silica powders indicated below in which no silane coupling agents were used in the resin. The following flexural strength values were determined:

Particle size:                 Flexural strength (p.s.i.)
    50 mesh ------------------------------ 2,400
    100 mesh ----------------------------- 5,200
    325 mesh ----------------------------- 6,800
    25 micron ----------------------------- 8,500
    5 micron ------------------------------ 9,200
    Celite–270 ---------------------------- 9,700

Without the saline, the strength decreases with the increase in filler particle size. This is the general pattern for fillers in plastics and rubbers, as accepted by those skilled in these arts.

*Example IV*

A monomeric mix of the following proportion was prepared: 95 parts vinyl toluene, 5 parts of 55% divinyl benzene; 1.0 part of A–172 silane; 0.06 part of 10% formic acid; 1 part of benzoyl peroxide; and 1 part of dicumyl peroxide. This mix was combined in the ratio of 80/20 with 200 mesh quartz powder and cured in a cavity mold by heating 10 minutes at 300° F. The panel therefrom had a flexural strength of 12,600 p.s.i.; was not affected by immersion in boiling water for 7 days; and had an excellent glossy surface.

*Example V*

Binary premixes were made with a variety of fillers using the resin portion of resin premix A of Example I except that no water was added. Panels were cured at 370° F. in a similar manner and a portion of each was postcured at 350° F. for one hour. As may be seen from Table III below, none of the fillers usually used in reinforced plastics or mineral filled thermosetting resins responds to the vinyl silane as does the quartz. Thus, quartz powders, considered in the past to be too large in particle size and too low in surface area to be applicable as fillers in thermosetting resins, are highly superior to all other fillers when used with a thermosetting hydrocarbon resin containing an unsaturated silane ester.

TABLE III.—RESULTS FROM EXAMPLE VII

| Filler | Particle Size | Post Cure | Ratio, Filler/Resin | Flexural Strength Dry | Flexural Strength After 7 Day Water Boil |
|---|---|---|---|---|---|
| Mica | 100 Mesh | No / Yes | 60/40 | 5,200 / 7,000 | 3,950 / 4,050 |
| Mica | 200 Mesh | No / Yes | 50/50 | 6,100 / 7,400 | 4,680 / 5,100 |
| Hydrated Alumina | 325 Mesh a | No / Yes | 75/25 | 8,450 / 8,000 | 5,350 / 5,270 |
| Emtol-500 Talc | Fine | No / Yes | 72/28 | 5,900 / 5,400 | -------- |
| ASP-403 Clay | 5 Micron | No / Yes | 50/50 | 6,200 / 8,500 | 6,200 / 7,600 |
| Quartz | 270 Mesh b | No / Yes | 78/22 | 13,000 / 13,500 | 11,300 / 11,100 | a 99% passes through 325 mesh sieve.
b 97.5% passes through 270 mesh sieve.

*Example VI*

As may be noted from Example V, slightly inferior results were obtained with the quartz powder as compared to Examples I and II when 1 part of water was added to the resin to facilitate the hydrolysis of the silane ester. Most fillers and fibers contain sufficient adsorbed water to partially or completely hydrolyze the silane ester. However, since quartz adsorbs very little moisture even when exposed to moist air it may be necessary to add extraneous moisture to the resin or to the filler prior to premix preparation.

Example I was repeated using the resin portion of resin premix A except that no water was added and the 200 mesh Supersil was heated at 1200° F. for 24 hours prior to mixing with the resin. The cured panel had a flexural strength of only 11,000 p.s.i. which decreased to 8,500 after immersion in boiling water for seven days.

*Example VII*

Five hundred grams of 200 mesh Supersil quartz was slurried in water containing 5 grams of A-172 silane. The pH was adjusted to 4.0 with formic acid to facilitate hydrolysis of the silane ester. The quartz was filtered, water washed, and dried under vacuum at 200° F. It was then used as a premix with the resin portion of the resin premix B used in Example I with no additional A-172 and no water added to the resin. The molded panel evaluated as follows:

| Post Cure | Flexural, Dry | Flexural, After Water Boil |
|---|---|---|
| No | 9,350 | 7,000 |
| Yes | 11,500 | 7,550 |

It may be seen that inferior results were obtained as compared to adding the silane to the quartz filler in the resin used in preparing the premix.

*Example VIII*

One hundred parts of low density polyethylene plastic was compounded with 60 parts of 325 mesh quartz powder, average particle size of about 15 microns. Portions of this mix were then compounded as follows:

(A) 2 parts of dicumyl peroxide per 100 parts of polymer.
(B) Same as (A), but 1% of A-172 based on the quartz was added.
(C) Same as (B), except 1% of water based on the quartz was also added.

The above was molded and cured at 320° F. for 45 minutes. Dumbbells were cut from each and tensile strengths (T.S.) determined at room temperature and at 170° F. as shown herebelow:

| Sample No. | Room Temp. T.S., p.s.i. | Room Temp. Percent Elong. | 170° F. T.S., p.s.i. | 170° F. Percent Elong. |
|---|---|---|---|---|
| A | 1,810 | 100 | 1,015 | 175 |
| B | 1,790 | 125 | 1,070 | 310 |
| C | 1,840 | 155 | 1,090 | 325 |

These data demonstrate the advantage of using both a silica filler and a silane when crosslinking a polyolefin such as polyethylene by means of a peroxide.

Having set forth the general nature and specific embodiments of the present invention, the true scope is now particularly pointed out in the appended claims.

What is claimed is:
1. A process which comprises admixing:
   A. coarse silica having an average particle size of 10 to 100 microns; and
   B. an organic silane containing an unsaturated hydrocarbon radical attached to the silicon atom; and
   C. a thermosetting mix containing a mixture selected from the group consisting of:

(1)
   (a) polymers of $C_2$–$C_{12}$ olefins, and
   (b) a peroxide catalyst; and (2)
   (a) homopolymers of $C_4$–$C_6$ conjugated diolefins,
   (b) a peroxide catalyst, and
   (c) 0 to 70%, based on the weight of said thermosetting mix, of at least one monomeric crosslinking agent selected from the group consisting of monovinyl aromatics, polyvinyl aromatics, acrylic acid esters of monohydric alcohols, methacrylic acid esters of monohydric alcohols, acrylic acid esters of polyhydric alcohols, alkyl fumarates, allyl esters, vinyl esters and mixtures thereof; and (3)
   (a) copolymers of $C_4$–$C_6$ conjugated diolefins with minor amounts of ethylenically unsaturated monomers,
   (b) a peroxide catalyst, and
   (c) 0 to 70%, based on the weight of said thermosetting mix, of at least one monomeric crosslinking agent selected from the group consisting of monovinyl aromatics, polyvinyl aromatics, acrylic acid esters of monohydric alcohols, methacrylic acid esters of monohydric alcohols, acrylic acid esters of polyhydric alcohols, alkyl fumarates, allyl esters, vinyl esters and mixtures thereof; and (4)
(a) a monomeric styrene compound having the formula:

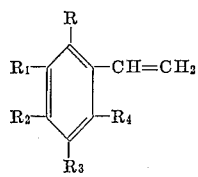

wherein R, $R_1$, $R_2$, $R_3$ and $R_4$ are each independently selected from the group consisting of hydrogen, halogen and alkyl radicals containing not more than 18 carbon atoms, and (b) 0 to 20%, based on the weight of said thermosetting mix, of monofunctional monomer selected from the group consisting of acrylonitrile, alpha chloroacrylonitrile, methyl methacrylate, n-butyl methacrylate, vinylidine chloride, diethyl fumarate, dibutyl fumarate, vinyl propionate, ethyl acrylate, butyl acrylate, allyl benzoate, allyl hexoate, vinyl n-butyl ether, and vinyl stearate, and (c) a peroxide catalyst and (d) at least 0.5 part, per 100 parts of said thermosetting mix, of a polyolefinic monomer selected from the group consisting of the methacrylate esters of polyhydric alcohols and polyvinyl compounds having the formula:

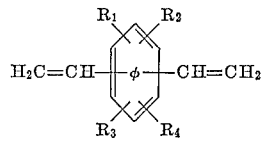

wherein $R_1$, $R_2$, $R_3$ and $R_4$ are each independently selected from the group consisting of hydrogen, halogen, alkyl groups and a vinyl group; and $\phi$ is an aromatic nucleus selected from the group consisting of benzene, naphthalene, biphenyl and phenanthrene.

2. A process according to claim 1 in which the polymer is a normally liquid copolymer of butadiene and styrene.

3. A process according to claim 1 in which the polymer is a normally liquid homopolymer of butadiene.

4. A process according to claim 1 in which the silane is selected from the group consisting of vinyl triethoxy silane, vinyl triisopropoxyl silane, divinyl diethoxy silane, the ester of vinyl silicic acid and the monomethyl ether of ethylene glycol, allyl triethoxyl silane, and allyl dimethyl ethoxy silane.

5. A process according to claim 1 in which the peroxide catalyst consists of a mixture of dicumyl peroxide and ditertiary butyl peroxide.

6. A process according to claim 1 in which the polyolefin is polyethylene.

7. A process according to claim 1 in which the polyolefin is polypropylene.

8. A composition of matter prepared according to the process of claim 1.

References Cited by the Examiner

UNITED STATES PATENTS

| | | | |
|---|---|---|---|
| 2,502,949 | 4/1950 | Howlett et al. | 260—41.5 |
| 2,831,829 | 4/1958 | Brooks et al. | 260—41.5 |
| 2,859,198 | 11/1958 | Sears et al. | 260—37 |
| 2,897,173 | 7/1959 | Boggs | 260—41 |
| 2,952,595 | 9/1960 | Jordan et al. | 204—154 |
| 3,062,242 | 11/1962 | Vanderbilt | 260—41.5 |

FOREIGN PATENTS 527,463   7/1956   Canada.

MORRIS LIEBMAN, *Primary Examiner.*

DANIEL ARNOLD, *Examiner.*

B. S. LEON, K. B. CLARKE, J. S. WALDRON,
*Assistant Examiners.*